United States Patent
Engelko et al.

(10) Patent No.: US 9,213,728 B2
(45) Date of Patent: Dec. 15, 2015

(54) CHANGE DATA CAPTURING DURING AN UPGRADE

(75) Inventors: Andrey Engelko, Karlsruhe (DE); Wieland Hoprich, Mannheim (DE); Dirk Debertin, Karlsruhe (DE); Klaus Daschakowsky, Bad Schoenborn (DE); Tobias Wenner, Nussloch (DE)

(73) Assignee: SAP SE, Walldorf (DE)

( * ) Notice: Subject to any disclaimer, the term of this patent is extended or adjusted under 35 U.S.C. 154(b) by 15 days.

(21) Appl. No.: 13/325,896

(22) Filed: Dec. 14, 2011

(65) Prior Publication Data

US 2013/0159247 A1 Jun. 20, 2013

(51) Int. Cl.
*G06F 17/30* (2006.01)

(52) U.S. Cl.
CPC .... *G06F 17/30309* (2013.01); *G06F 17/30002* (2013.01)

(58) Field of Classification Search
CPC .......................... G06F 17/303; G06F 17/30309
USPC .................................................. 707/609, 615
See application file for complete search history.

(56) References Cited

U.S. PATENT DOCUMENTS

| | | | |
|---|---|---|---|
| 6,105,025 A * | 8/2000 | Jacobs et al. ......................... 1/1 |
| 6,151,608 A | 11/2000 | Abrams |
| 6,385,770 B1 | 5/2002 | Sinander |
| 6,711,560 B2 | 3/2004 | Levy et al. |
| 6,721,725 B2 | 4/2004 | Levy et al. |
| 6,999,977 B1 | 2/2006 | Norcott et al. |
| 7,028,022 B1 | 4/2006 | Lightstone et al. |
| 7,085,831 B2 | 8/2006 | Larkin |
| 7,111,023 B2 | 9/2006 | Norcott |
| 7,236,991 B2 | 6/2007 | Becker et al. |
| 7,461,097 B2 * | 12/2008 | Stahl et al. ............................ 1/1 |
| 7,523,142 B2 | 4/2009 | Driesen et al. |
| 7,620,665 B1 | 11/2009 | George et al. |
| 7,647,354 B2 | 1/2010 | Norcott |
| 7,657,576 B1 | 2/2010 | Norcott |
| 7,694,292 B2 | 4/2010 | Mueller et al. |
| 7,917,475 B2 | 3/2011 | D'Souza et al. |
| 8,060,713 B1 | 11/2011 | Natanzon |
| 8,230,416 B2 | 7/2012 | Ivanov |
| 8,984,514 B2 | 3/2015 | Hoprich |
| 2002/0143731 A1 | 10/2002 | Levy et al. |

(Continued)

OTHER PUBLICATIONS

Hudson, "Slashing Downtimes with Online Patching", Oracle, 2011, 54 pages.

(Continued)

*Primary Examiner* — Boris Gorney
*Assistant Examiner* — Kris Andersen
(74) *Attorney, Agent, or Firm* — Brake Hughes Bellermann LLP

(57) ABSTRACT

In one general aspect, a computer system can include instructions stored on a non-transitory computer-readable storage medium. The computer system can include a logging table generator configured to generate a logging table corresponding with an original table targeted for an upgrade, and a control table generator configured to generate a control table configured to store a version identifier for changes logged in the logging table. The computer system can include a change recorder configured to receive an indicator of a change to a record of the original table during execution of at least a portion of the upgrade of the original table, and a key recorder configured to store in the logging table a primary key identifying the record of the original table and the version identifier stored in the control table.

20 Claims, 10 Drawing Sheets

(56) References Cited

U.S. PATENT DOCUMENTS

| | | | |
|---|---|---|---|
| 2003/0130985 | A1 | 7/2003 | Driesen et al. |
| 2003/0135478 | A1 | 7/2003 | Marshall et al. |
| 2004/0044997 | A1 | 3/2004 | Talati et al. |
| 2005/0165802 | A1 | 7/2005 | Sethi et al. |
| 2005/0251523 | A1 | 11/2005 | Rajamani et al. |
| 2007/0027934 | A1 | 2/2007 | Roehrle et al. |
| 2007/0180289 | A1 | 8/2007 | Chai et al. |
| 2007/0220065 | A1 | 9/2007 | Coyle et al. |
| 2007/0250542 | A1 | 10/2007 | Chan et al. |
| 2008/0098037 | A1 | 4/2008 | Neil et al. |
| 2008/0098045 | A1 | 4/2008 | Radhakrishnan et al. |
| 2008/0098046 | A1 | 4/2008 | Alpern et al. |
| 2008/0115134 | A1 | 5/2008 | Elliott et al. |
| 2008/0256528 | A1 | 10/2008 | Waitzmann et al. |
| 2008/0294933 | A1 | 11/2008 | Nishii et al. |
| 2009/0077563 | A1 | 3/2009 | Thies et al. |
| 2009/0094236 | A1* | 4/2009 | Renkes et al. ............ 707/6 |
| 2009/0113413 | A1 | 4/2009 | Reinz |
| 2009/0172655 | A1 | 7/2009 | Ivanov |
| 2009/0307277 | A1* | 12/2009 | Grubov et al. ............ 707/203 |
| 2010/0088281 | A1* | 4/2010 | Driesen et al. ............ 707/641 |
| 2010/0211548 | A1 | 8/2010 | Ott et al. |
| 2010/0218196 | A1 | 8/2010 | Leung et al. |
| 2010/0249980 | A1 | 9/2010 | Ito |
| 2010/0318494 | A1* | 12/2010 | Val et al. ............ 707/609 |
| 2011/0238888 | A1 | 9/2011 | Chiu et al. |
| 2011/0252000 | A1 | 10/2011 | Diaconu et al. |
| 2011/0252426 | A1 | 10/2011 | Antani et al. |
| 2012/0089625 | A1 | 4/2012 | Bentzien et al. |
| 2012/0137297 | A1 | 5/2012 | Hoprich |
| 2012/0166393 | A1 | 6/2012 | Hoprich et al. |
| 2012/0166493 | A1 | 6/2012 | Bentzien et al. |
| 2012/0185439 | A1* | 7/2012 | Chen et al. ............ 707/661 |
| 2013/0290259 | A1 | 10/2013 | Hoprich et al. |

OTHER PUBLICATIONS

"Triggers", Oracle8iConcepts, Release 2 (8.1.6), Part No. A76965-01, 2000, 23 pages.

"Oracle Data Guard 11g Data Protection Availablity for Oracle Database", An Oracle Technical White Paper, Oct. 2011, 22 pages.

"Oracle Data Guard Concepts and Administration 11g Release 1 (11.1)", Part No. B28294-03Oracle, 2008, 2 pages.

Ray, et al, "Seamless Application Failover with Oracle Data Guard", Oracle, Dec. 2010, 67 pages.

"Oracle Beehive Administrator's Guide Release 1 (1.5)", Part No. E14836-04, Oracle, 2009, 8 pages.

"Oracle In-Memory Database Cache User's Guide 11g Release 2 (11.2.2)", Part No. E21634-05, Oracle, 2012, 5 pages.

"Openworld 2011—Day 3 Summary", Oracle Apps Blog, Oct. 26, 2011, 3 pages.

"Using Triggers", Oracle9i Application Developer's Guide—Fundamentals Release 2 (92), Part No. A96590-01, 2002, 43 pages.

Extended European Search Report for EP Application No. 12005938.1, mailed Feb. 4, 2013, 5 pages.

Non-Final Office Action for U.S. Appl. No. 12/956,902, mailed Apr. 11, 2013, 15 pages.

Final Office Action for U.S. Appl. No. 12/979,175, mailed Sep. 17, 2013, 22 pages.

Non-Final Office Action for U.S. Appl. No. 13/929,221, mailed Nov. 19, 2013, 19 pages.

Notice of Allowance for U.S. Appl. No. 12/902,475, mailed Mar. 31, 2015, 5 pages.

Non-Final Office Action received for U.S. Appl. No. 12/979,175, mailed on Nov. 5, 2014, 17 pages.

Notice of Allowance received for U.S. Appl. No. 12/956,902, mailed on Nov. 20, 2014, 5 pages.

* cited by examiner

CHANGE DATA CAPTURING DURING AN UPGRADE

TECHNICAL FIELD

This description relates to upgrading an original system to a target system.

BACKGROUND

Many known techniques for adjusting database objects within an original system can cause an undesirable level of downtime within the original system. For example, using many of these known techniques, all of the database objects of an original system may be unavailable to users while the database objects are being adjusted, and thus the upgrading of the system may necessarily be implemented during a downtime of the entire original system. The duration and impact of the downtime of the original system and/or unavailability of the database objects targeted for upgrade aggravated by known computationally expensive and/or time-consuming algorithms employed during modification of the database objects of the original system into an upgraded form. Thus, a need exists for systems, methods, and apparatus to address the shortfalls of present technology and to provide other new and innovative features.

SUMMARY

In one general aspect, a computer system can include instructions stored on a non-transitory computer-readable storage medium. The computer system can include a logging table generator configured to generate a logging table corresponding with an original table targeted for an upgrade, and a control table generator configured to generate a control table configured to store a version identifier for changes logged in the logging table. The computer system can include a change recorder configured to receive an indicator of a change to a record of the original table during execution of at least a portion of the upgrade of the original table, and a key recorder configured to store in the logging table a primary key identifying the record of the original table and the version identifier stored in the control table.

In another general aspect, a non-transitory computer-readable storage medium can store code representing instructions that when executed are configured to cause a processor to perform a process. The code can include code to generate a logging table corresponding with an original table targeted for an upgrade, and to generate a control table configured to store a version identifier for changes logged in the logging table. The code can also include code to receive an indicator of a change to a record of the original table during execution of at least a portion of the upgrade of the original table, and to store in the logging table a primary key identifying the record of the original table and the version identifier stored in the control table.

In yet another general aspect, a method can include executing instructions recorded on a non-transitory computer-readable storage media using at least one processor. The method can include generating a logging table corresponding with an original table targeted for an upgrade, and generating a control table configured to store a version identifier for changes logged in the logging table. The method can include receiving an indicator of a change to a record of the original table during execution of at least a portion of the upgrade of the original table, and storing in the logging table a primary key identifying the record of the original table and the version identifier stored in the control table.

The details of one or more implementations are set forth in the accompanying drawings and the description below. Other features will be apparent from the description and drawings, and from the claims.

DETAILED DESCRIPTION

Figure 1:
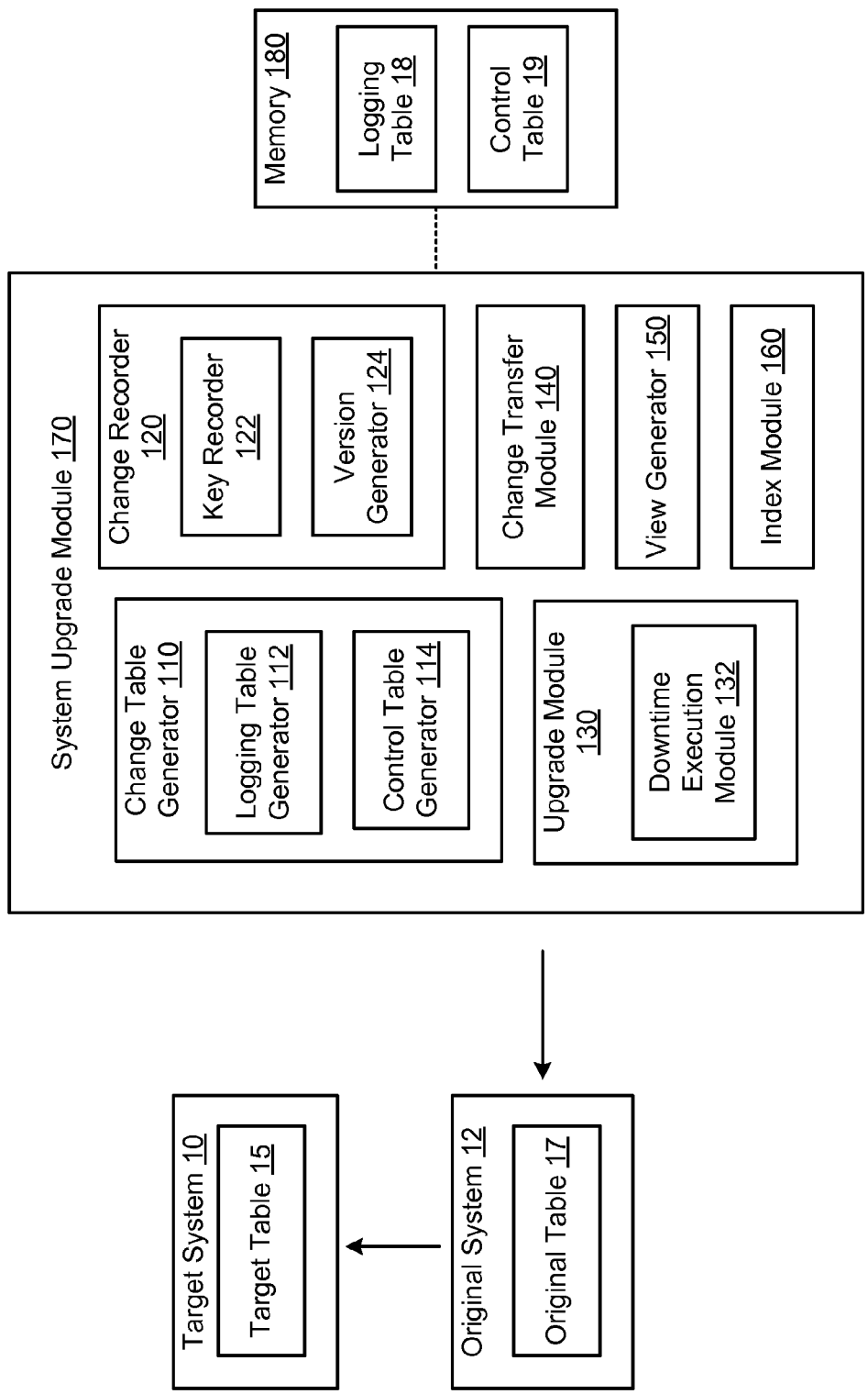
FIG. 1 is a block diagram that illustrates a system upgrade module configured to facilitate an upgrade of an original table of an original system to a target table of a target system.

FIG. 1 is a block diagram that illustrates a system upgrade module 170 configured to facilitate an upgrade (e.g., an upgrade process, an upgrade procedure) of an original table 17 of an original system 12 to a target table 15 of a target system 10. The target system 10 can be an upgraded version of the original system 12. Accordingly, target table 15 can be an upgraded version of the original table 17 that is operating within the target system 10, which can be an upgraded version of the original system 12. In some embodiments, one or more of the tables (e.g., the target table 15, the original table 17) can be referred to as databases, or can be included in one or more databases. Although only one original table shown in FIG. 1, the original system 12 can include more than one original table that can be upgraded during an upgrade process to more than one target table. In some embodiments, the original table 17 can be referred to as a source table. In some embodiments, the system upgrade module 170 can be configured to facilitate an upgrade based on a database interface (DBI) implementation and/or in response to database triggers (e.g., database change triggers).

In some embodiments, the upgrade can include a software and/or a hardware upgrade to one or more portions of the original system 12, an upgrade to a format, a logical structure, data etc. of at least a portion of the original system 12, and/or so forth. In some embodiments, the original system 12 can be a stand-alone device and/or module, a server, a network, a data center, a software and/or hardware system, a virtual system, a system (e.g., an SAP system) defined based on Advanced Business Application Programming (ABAP), and/or so forth. In some embodiments, the target system 10 can be a physically different system from the original system 12, or can be an upgraded version of the original system 12 that is included in the hardware (e.g., same hardware) of the original system 12.

As shown in FIG. 1, the original table 17 (e.g., the source table) can be related to, or can include, program data and/or user data. For example, the original table 17 can include data defined by an owner of the original system 12. For example, the original table 17 can include user-specific data such as business data, financial data, and/or so forth. In some embodiments, the data stored within the original table 17 can be referred to as customer data. In some embodiments, the original table 17 can be referred to as a customer database. The original table 17 can include, or can be, for example, data (e.g., configuration data) associated with a program of the original system 12. In some embodiments, the data stored within the original table 17 can be referred to as system data. If the original system 12 is an ABAP-based system, the original table 17 can be ABAP repository tables. In some embodiments, the original table 17 can include, or can be, more than one table or database. Although not shown in FIG. 1, the original table 17 can be associated with executable files. In some embodiments, the executable files can define at least a portion of the kernel associated with an operating system of the original system 12.

The system upgrade module 170 can be configured to facilitate upgrading of the original system 12 to the target system 10 so that downtime of the original system 12 can be maintained at a relatively low level (e.g., reduced, minimized) during an upgrade process. In other words, the system upgrade module 170 can be configured to facilitate upgrading of the original system 12 to the target system 10 so that uptime of the original system 12 can be maintained at a relatively high level (e.g., increased, minimized) during an upgrade process. The terms up/upstate and down/downstate will be used to describe a functional state of a system (e.g., the target system 10, the original system 12), while the terms uptime and downtime will be used to describe the accessibility of the system by one or more users (while in a functional state). Thus, a system may be functional, but not accessible (e.g., accessible in a typical operational mode) by a typical user (e.g., a non-admin user) when the system is up. In other words, the system can be in downtime, and may not be accessible by a typical user, even though the system is up (e.g., in an upstate). The system, however, will be functional and accessible by a typical user during uptime. For example, when the original system 12 is in a downstate during downtime of the original system 12, data from the original table 17 of the original system 12 may not be accessed by a user of the original system 12. Instead, the original table 17 may be locked so that data cannot be retrieved from and/or stored to the original table 17.

The system upgrade module 170 can be configured to record (e.g., log, store) changes to the original system 12 while upgrading of the original system 12 to the target system 10 is in process so that an uptime of the original system 12 can be maintained at a relatively high level. Because portions of the original system 12 can be in uptime during an upgrade process to the target system 10, changes to the original system 12 may continually be occurring during the upgrading to the target system 10. The portions of the original system 12 can be in uptime so that a typical user may continue to access the original system 12 rather than locking the entire original system 12 during the upgrade process. The changes to the original system 12 that are recorded during the upgrade process can later be transferred (e.g., transferred during a later portion of the upgrade process) to the target system 10.

For example, after a portion of data stored in the original table 17 has been migrated during an upgrade process into the target table 15 (which can be structurally upgraded from the original table 17), subsequent changes to the portion of the data stored in the original table 17 may occur, or may be triggered, by a user accessing the data in the original table 17. The subsequent changes can be recorded (e.g., logged, stored) by the system upgrade module 170 and later transferred into the target table 15. Only the subsequent changes may be recorded and transferred so that all of the data that was previously migrated may not need to be re-migrated into the target table 15 because of the subsequent changes. This recording and transfer process (which can be at least a portion of a change recording process or as a change data capturing process) can be iteratively performed during the upgrade process until the upgrade process is completed. By so doing, users may continue to access and use the original table 17 in uptime while other processing to implement the upgrade process can be performed, and any changes to the original table 17 that occur during the upgrade process may not be missed (or may be minimized) and can eventually be transferred into the target table 15.

In some embodiments, upgrading to the target system 10 can be performed via a shadow system (not shown). The shadow system can be an environment within which certain operations of an upgrade process can be performed so that the original system 12 can operate in an active mode (e.g., remain in an upstate/uptime, continue in a normal operational environment) during the upgrade process. Specifically, the shadow system can include one or more portions (e.g., databases, executable files) that correspond with portions (e.g., databases, executable files) of the original system 12. The portions of the shadow system that correspond with the portions of the original system 12 can be referred to as corresponding portions. In some embodiments, the portions of the shadow system that correspond with the portions of the original system 12 can be upgraded versions (e.g., modified versions) or exact copies of the portions of the original system 12. Portions of the upgrade process of the original system 12 can be performed on the corresponding portion(s) of the shadow system while the original system 12 operates in an active mode. The corresponding portions of the shadow system, after being upgraded, can later be copied into (and replace portions of) the original system 12.

By performing certain portions of the upgrade process on the shadow system rather than directly on the original system 12, the downtime of the original system 12 can be lower than if certain portions of the upgrade process are performed directly on the original system 12. In some embodiments, the downtime of the original system 12 during an upgrade process can be minimized by performing certain portions of the upgrade process in the shadow system. In some embodiments, the shadow system can be referred to as a shadow system because portions of the shadow system can mirror (or shadow) certain portions of the original system 12. In some embodiments, the downtime of the original system 12 during an upgrade process can be minimized by performing certain portions of the upgrade process in the shadow system.

In some embodiments, a shadow system can be defined specifically for use during the upgrade process. Specifically, the shadow system can be a temporary system created for use during upgrade of the original system 12. After the original system 12 has been upgraded, the shadow system and/or logs (e.g., change recording logs) associated with the shadow system can be dismantled and/or expunged.

Any changes that occur to the original system 12 while portions of the upgrade process are performed on the shadow system can be recorded (e.g., logged) and later transferred into the shadow system. In some embodiments, the changes that occurred in the original system 12 or portions of that great process are performed on the shadow system can be iteratively recorded and transferred into the shadow system. More details related to a shadow system implementation are discussed in connection with, for example, FIG. 8.

As shown in FIG. 1, the system upgrade module 170 includes an upgrade module 130. The upgrade module 130 can be configured to perform various parts of an upgrade process. For example, the upgrade module 130 can be configured to identify whether or not portions of the original system 12 (e.g., original table 17 of the original system 12) are to be upgraded. The upgrade module 130 can be configured to define one or more portions of the target system 10 and/or a temporary system (e.g., a shadow system) (or portions thereof). In some embodiments, the upgrade module 130 can be configured to replicate, or initially transfer, data included in the original table 17 to the target table 15. The upgrade module 130 can be configured to modify one or more portions (e.g., a data portion, a structure portion) of the original system 12 and/or target system 10 based on one or more customizations implemented within the original system 12. In some embodiments, the upgrade module 139 can be configured to dismantle (e.g., remove, disabled) one or more temporary systems (e.g., a shadow system) used during an upgrade process. The upgrade module 130 can be configured to handle an upgrade of one or more executable files (not shown) associated with the original system 12.

The upgrade module 130 can include a downtime execution module 132 configured to manage a downstate and/or an upstate of the original system 12, the target system 10 and/or a temporary system (e.g., a shadow system) during an upgrade process. During downtime, the original system 12 may be in a downstate or an upstate, and during the uptime, the original system 12 will be in an upstate.

In some embodiments, the downtime execution module 132 can be configured to suspend one or more batch jobs of the original system 12 when (e.g., before) a downtime of the original system 12 is initiated. In some embodiments, the downtime execution module 132 can be configured to log-off one or more user from the original system 12 before a downtime of the original system 12 is initiated.

As shown in FIG. 1, the system upgrade module 170 includes a change table generator 110 and a change recorder 120. The change table generator 110 is configured to generate (e.g., produce, define) one or more tables associated with the change recording process. The change recorder 120 is configured to record changes to the original table 17 into the tables generated by the change table generator 110.

Specifically, the change table generator 110 includes a logging table generator 112. The logging table generator 112 is configured to generate a logging table 18 where changes to at least a portion of the original system 12 (e.g., changes to the original table 17) can be recorded. In this embodiment, the logging table 18 is stored in a memory 180 associated with the system upgrade module 170. For example, if a change to a record in the original table 17 occurs (e.g., is triggered), an indicator (e.g., a key (also can be referred to as a primary key) or other type of pointer) of the record can be recorded in the logging table 18. In some embodiments, a record can be referred to as an entry. The indicator stored in logging table 18 can function as an indicator that the change to the record, which should later be transferred to the target table 15, has occurred during the upgrade process. In other words, changes to one or more records included in the original table 17 can be identified within the logging table 18 using one or more indicators.

In some embodiments, various information (e.g., metadata) about the change to the record (e.g., entry) can be recorded in the logging table 18. For example, a date/time stamp of the change to the record, information about the specifics of the change to the record, and/or so forth can be recorded in logging table 18.

As shown in FIG. 1, the change recorder 120 includes a key recorder 122. The key recorder 122 can be configured to receive an indicator that a change to a record in the original table 17 has occurred. In response to the indicator of the change to the record, the key recorder 122 can be configured to record (e.g., log, store), in the logging table 18, a key (e.g., a copy of a key) related to the record that has changed. In some embodiments, the key can be a primary key uniquely identifying each record in the original table 17. Accordingly, the recording of the key (or copy thereof) in the logging table 18 can function as an indicator that the change to the record has occurred.

As a specific example, a record stored in the original table 17 can be associated with a key. As part of a first portion of an upgrade process, the logging table 18 can be generated by the logging table generator 112, and the record stored in the original table 17 can be migrated to the target table 15. During a second portion of the upgrade process, the record stored in the original table 17 can be modified (e.g., changed) by a user accessing the original table 17. In response to a modification to the record, a trigger (e.g., a database trigger generated by the original system 12 (e.g., the original table 17)) indicating that a modification to the record has occurred can be received by the key recorder 122, and the key recorder 122 can be configured to store the key (or a copy of the key) in the logging table 18. The key stored in logging table 18 can function as an indicator that the change to the record has occurred during the second portion of the upgrade process.

In some embodiments, because only an indicator of (e.g., a pointer to) a change to a record of the original table 17 is stored in logging table 18, a history of changes to the record of the original table 17 may not be stored in logging table 18. The indicator can point to a record (e.g., a location of a record) of the original table 17 that has changed without including specifics of a manner in which data within the record has changed. Accordingly, after the indicator of the change to the record of the original table 17 has been stored in the logging table 18, previous changes to the record of the original table 17 may not be recorded. Said differently, after the indicator of the change to the record of the original table 17 has been stored in the logging table 18, prior changes, which are subsequently overwritten with subsequent changes, may not be recalled because the specifics of the priori change may not be recorded. In other words, the indicator can be associated with multiple changes to the record of the original table 17 that can occur serially over a time period. Accordingly, only the last change (or the most recent change) to the record of the original table 17 may be retrieved from the original table 17.

As shown in FIG. 1, the control table generator 114 is configured to generate (e.g., define, produce) a control table 19. In this embodiment, the control table 19 is stored in a memory 180 of the system upgrade module 170. The control table 19 is configured to store a version identifier associated with a set (e.g., a batch, a group) of changes to records of the original table 17.

For example, a first set of changes to records of the original table 17 triggered during a first portion (e.g., a first time period) of an upgrade process can be associated with a first version identifier stored in the control table 19. A second set of changes to records of the original table 17 triggered during a second portion (e.g., a second time period) of an upgrade process can be associated with a second version identifier stored in the control table. In some embodiments, a version identifier can be referred to as a batch identifier or as a set identifier.

As shown in FIG. 1, the change recorder 120 includes a version generator 124. The version generator 124 is configured to define and store a version identifier in the control table 19. In some embodiments, the version generator 124 can be configured to increment (and replace) a version identifier stored in the control table 19. Although the control table 19 in this embodiment includes only one version identifier (e.g., one active version identifier), in some embodiments, multiple version identifiers (some of which may not be active) can be stored in the control table 19 by the version generator 124. In some embodiments, the version generator 124 can be configured to toggle a version identifier between different values (e.g., different version identifier values). In some embodiments, the version generator 124 can be configured to sequentially change (e.g., sequentially increase, sequentially decrease, monotonically change) a version identifier (e.g., a value of a version identifier).

In some embodiments, the version generator 124 can be configured to modify a version identifier stored in the control table 19 in response to a set of changes to records of the original table 17 being transferred to the target table 15. For example, as part of a first portion of an upgrade process, the logging table 18 and the control table 19 can be generated, and the original table 17 can be migrated to the target table 15. The version generator 124 can be configured to store a first version identifier (e.g., a version identifier having a first value) in the control table 19. During a second portion of the upgrade process, a set of records stored in the original table 17 can each be changed (e.g., can be changed serially and/or in parallel) by a user accessing the original table 17. In response to the changes to the set of records, the key recorder 122 can be configured to store keys (or copies of the keys) in the logging table 18 associated with the set of records, and the set of records can be associated with the first version identifier stored in the control table 19 by the version generator 124. In response to the changes to the set of records being transferred (based on the keys stored in the logging table 18) to the target table 15, a second version identifier (e.g., a version identifier having a second value) can be stored in the control table 19 by the version generator 124. Subsequent changes to records in the original table 17 can be associated with the second version identifier.

As shown in FIG. 1, the system upgrade module 170 includes a change transfer module 140. The change transfer module 140 can be configured to transfer changes to records included in the original table 17 and identified within the logging table 18 to the target table 15. In some embodiments, the change transfer module 140 can be configured to transfer one or more changes (e.g., a set of changes, a batch of changes) to records included in the original table to the target table 15. In some embodiments, the change transfer module 140 can be configured to transfer one or more changes based on a version identifier. For example, the change transfer module 140 can be configured to transfer a first set of changes identified within the logging table 18 and associated with a first version identifier to the target table 15 during a first portion of an upgrade process, and can be configured to transfer a second set of changes identified within the logging table 18 and associated with a second version identifier to the target table 15 during a second portion of the upgrade process.

In some embodiments, the change recorder 120 and the change transfer module 140 can be configured to iteratively perform recording and transferring, respectively, while the original system 12 is an uptime until the upgrade process is completed or nearly completed. In some embodiments, final changes to the original system 12 can be transferred by the change transfer module 140 while the original system 12 is locked in downtime. In some embodiments, the downtime execution module 132 can be configured to change the original system 12 from uptime to downtime.

If the original system 12 includes more than one original table (e.g., original table 17), change recording may be activated (e.g., enabled) or deactivated (e.g., disabled) for all, or less than all of the original tables included in the original system 12. For example, in some embodiments, change recording can be activated for only original tables included in the original system 12 that are targeted for upgrade. In some embodiments, change recording may be activated for a subset of the original tables included in the original system 12 that are targeted for upgrade. In some embodiments, change recording may be activated for only original tables included in the original system 12 that have one or more characteristics, such as being greater than a specified size, including a particular type of data, being subject to a particular type of upgrade, and/or so forth.

In some embodiments, change recording (e.g., a change recording process) can be activated for one or more original tables included in the original system 12 for a specified period of time. For example, change recording can be activated for the original table 17 during a first portion of an upgrade process, and can be deactivated for the original table 17 during a second portion of an upgrade process.

The tables described herein can be defined based on a structure, and the structure can include data. In other words, the tables described herein can have a structural component and a data component. The structural component can be associated with the data component, and vice versa. The structure of a table (such as the original table 17) can be defined by rows and/or columns. The data stored in the table can be divided into fields by the structure of the table. For example, a field of a table can be at an intersection of a row of the table and at a column of the table, and can include a portion of data. In some embodiments, the one or more of the table described herein can be, for example, MaxDB, an Oracle database, a DB2 database, and/or so forth. In some embodiments, the tables discussed herein can be referred to as repositories.

The system upgrade module 170 can be, or can be included within, for example, a client device and/or a server device. In some embodiments, the system upgrade module 170 can be, or can be included within, for example, a wired device and/or a wireless device (e.g., wi-fi enabled device) and can be, for example, a computing entity (e.g., a personal computing device), a mobile phone, a personal digital assistant (PDA) and/or so forth. The system upgrade module 170 can be configured to operate based on one or more platforms (e.g., one or more similar or different platforms) that can include one or more types of hardware, software, firmware, operating systems, runtime libraries, and/or so forth. In some embodiments, the system upgrade module 170 can be defined using ABAP and/or can be related to a NetWeaver platform.

In some embodiments, the memory 180 can be implemented as more than one memory component (e.g., more than one random-access memory (RAM) component or disk drive memory) associated with the system upgrade module 170. In some embodiments, the memory 180 can be, or can include, a non-local memory (e.g., a memory not physically included within the system upgrade module 170) within a network (not shown). For example, the memory 180 can be, or can include, a memory shared by multiple system upgrade modules (not shown) within a network. In some embodiments, the memory 180 can be included in the system upgrade module 170, the original system 12 and/or the target system 10.

Although not shown, the system upgrade module 170 can be configured to operate within an environment that includes an operating system. In some embodiments, the operating system can be configured to facilitate the functions of the system upgrade module 170.

In some embodiments, one or more portions of the components shown in the system upgrade module 170 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the system upgrade module 170 can be, or can include, a software module configured for execution by at least one processor (not shown). In some embodiments, the functionality of the components can be included in different modules and/or components than those shown in FIG. 1. For example, although not shown, the functionality of the change table generator 110 can be included in a different module than the change table generator 110, or divided into several different modules (not shown).

In some embodiments, the system upgrade module 170, the original system 12, and/or the target system 10 can be included within a network that can include multiple devices (e.g., multiple client devices, multiple server devices). For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can be have portions based on various protocols such as Internet Protocol (IP) and/or a proprietary protocol. The network can include at least a portion of the Internet. Also, although not shown in FIG. 1, the system upgrade module 170 can be configured to function within various types of network environments. In some embodiments, the system upgrade module 170 can represent, or can be included within, a cluster of modules/devices. In such an embodiment, the functionality and processing of the system upgrade module 170 can be distributed to several modules/devices of the cluster of modules/devices.

Figure 2:
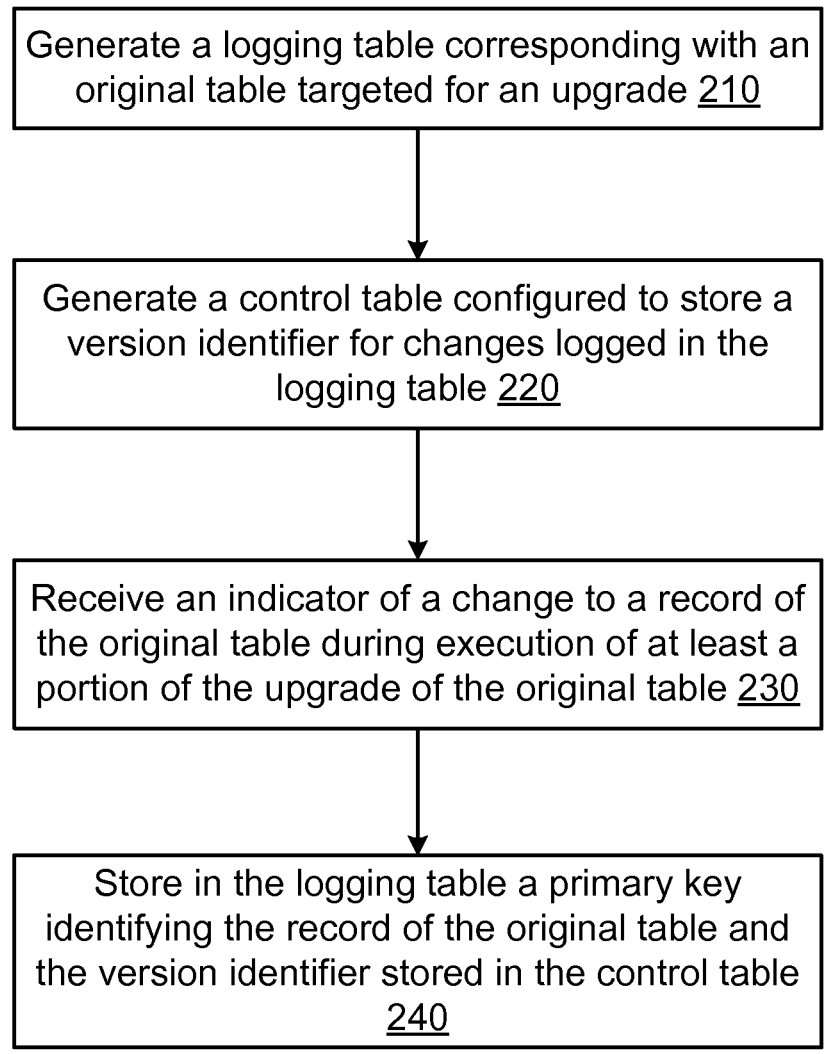
FIG. 2 is a flowchart that illustrates a method for implementing change recording during an upgrade process.

FIG. 2 is a flowchart that illustrates a method for implementing change recording during an upgrade process. In some embodiments, portions of the flowchart can be implemented by, for example, a system upgrade module such as the system upgrade module 170 shown in FIG. 1.

A logging table corresponding with an original table targeted for an upgrade can be generated (block 210). In some embodiments, the logging table generator 112 shown in FIG. 1 can be configured to generate the logging table corresponding with the original table targeted for the upgrade. In some embodiments, the original table can be identified for the upgrade by the upgrade module 130 shown in FIG. 1. In some embodiments, the logging table can be generated during an upgrade process.

A control table configured to store a version identifier for changes logged in the logging table can be generated (block 220). In some embodiments, the control table generator 114 shown in FIG. 1 can be configured to generate the control table configured to store the version identifier for changes logged in the logging table. In some embodiments, the version identifier can be defined by the version generator 124 shown in FIG. 1. In some embodiments, the version identifier can be associated with a set of changes logged in logging table.

An indicator of a change to a record of the original table can be received during execution of at least a portion of the upgrade of the original table (block 230). In some embodiments, the change recorder 120 shown in FIG. 1 can be configured to receive the indicator of the change to the record of the original table during execution of at least the portion of the upgrade of the original table. In some embodiments, the indicator the change to the record can be a database trigger produced by the original table and/or an original system of the original table.

A primary key identifying the record of the original table and the version identifier stored in the control table can be stored in the logging table (block 240). In some embodiments, the key recorder 122 shown in FIG. 1 can be configured to store in the logging table the primary key identifying the record of the original table and the version identifier stored in the control table. In some embodiments, the primary key can uniquely identify the record of the original table from other records of the original table, or from other original tables included in an original system.

Figure 3:
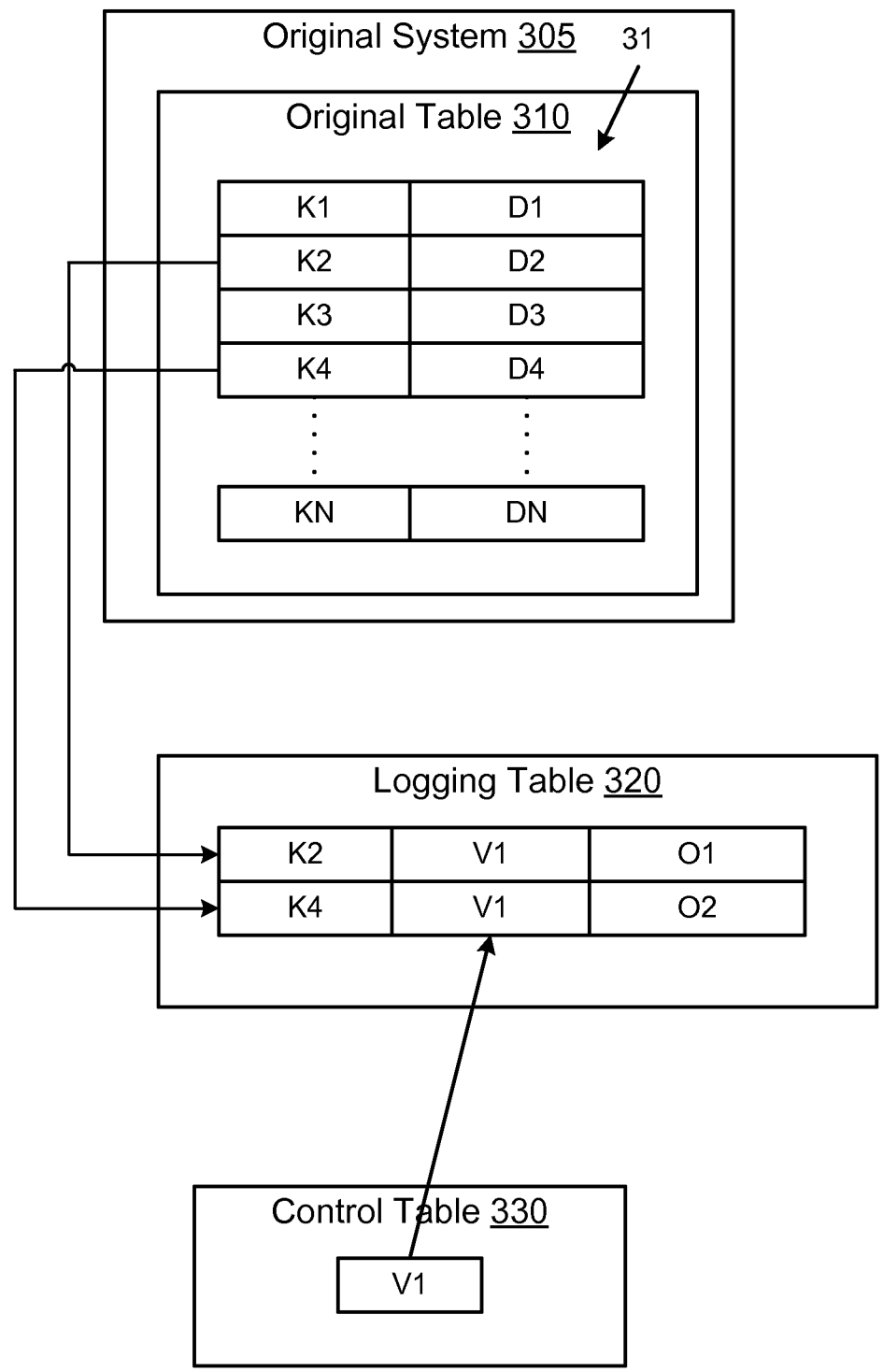
FIG. 3 is a diagram that illustrates an example of an original table, a logging table, and a control table, according to an embodiment.

FIG. 3 is a diagram that illustrates an example of an original table 310, a logging table 320, and a control table 330, according to an embodiment. The original table 310 can be a table of an original system 205 targeted for upgrading during an upgrade process. The logging table 320 and the control table 330 can be generated during the upgrade process for the original table 310. Specifically, changes to the original table 310 can be recorded using the logging table 320 and the control table 330.

As shown in FIG. 3, the original table 310 includes several records 31 (e.g., entries) including data D1 through DN. In this embodiment, each of the records 31 includes a key represented as keys K1 through KN. In some embodiments, the keys K1 through KN can also function as a data of the original table 310. In some embodiments, the data D1 through DN can include multiple fields. For example, data D2 can include multiple fields of data.

In some embodiments, one or more of the keys K1 through KN can be referred to as a primary key. The keys K1 through KN can each be used to identify (e.g., uniquely identify at least one of the records 31 of the original table 300. For example, the key K3 can be used to identify the record 31 associated with key K3 and data D3.

In some embodiments, one or more of the keys K1 through KN can include data stored in the original table 310 that is unique and/or that is generated by the original system 305 as, for example, a globally unique identifier (GUID). In some embodiments, one of the keys can include, or can be, multiple fields of data within the original table 310 associated with one of the records 31 of the original table 310. For example, the key K1 can include multiple fields of data.

The logging table 320 is configured to store one or more of the keys K1 through KN of records 31 of the original table 310 that have been changed during an upgrade process. In this embodiment, key K2 and key K4 are stored in logging table 320 because the records associated with each of these keys has been changed during an upgrade process.

As shown in FIG. 3, each of the keys K2 and K4 are associated with a version identifier V1. In this embodiment, the version identifier V1 is stored in the control table 330. In some embodiments, the version identifier V1 can be used to identify a batch or set of changes occurring during a specified time period to records 31 of the original table 310 during an upgrade process. In some embodiments, the version identifier V1 can be used to identify a packet (e.g., a data packet) including a change to one or more of the records 31.

In this embodiment, each of the keys stored in the logging table 320 is associated with an identifier of an operation. Specifically, key K2 is associated with operation identifier O1, and key K4 is associated with operation identifier O2. In some embodiments, the operation identifiers can identify a database operation such as a modification, deletion, a replacement, and/or so forth.

As shown in FIG. 3, the logging table 320 corresponds with the original table 310. In some embodiments, the logging table 320 can be the only logging table corresponding with the original table 310. In other words, a one-to-one correspondence between logging tables and original tables can be implemented. In some embodiments, logging table 320 can be associated with multiple original tables (e.g., original table 310), or the original table 310 can be associated with multiple logging tables (e.g., logging table 320).

In some embodiments, a logging table, such as logging table 320, may be generated only for original tables that are targeted for upgrade. Accordingly, logging tables may not be generated for original tables that are not targeted for upgrade.

As shown in FIG. 3, the control table 330 includes a single entry, which is the version identifier V1. In some embodiments, the control table 330 may only include a single entry corresponding with a version identifier. In some embodiments, if the version identifier is updated within the control table 330, the version identifier can be replaced (e.g., replaced with a version identifier having a different value). In some embodiments, the control table 330 can correspond with one or more logging tables (e.g., logging table 320) and/or with one or more original tables (e.g., original table 310). In other words, only a single instance of the control table 330 can exist so that the version identifier V1 is global for all or many logging tables (e.g., logging table 320).

Although not shown in FIG. 3, the logging table 320 can be indexed so that one or more of the changes logged in logging table 320 can be readily searched and/or accessed. In some embodiments, the logging table 320 can be indexed using unique indices and/or non-unique indices. In some embodiments, the use of unique indices and/or non-unique indices for logging table 320 can be contingent on a number of fields (e.g., a combined number of fields) associated with entries (e.g., each entry, each record) of the logging table 320.

For example, in some embodiments, if a number of fields (e.g., a combined number of fields) associated with the key and the version identifier stored in logging table 320 is less than a threshold value (e.g., less than 16 fields, less than 10 fields, less than 32 fields), the logging table 320 can be indexed using unique indices (or non-unique indices). In some embodiments, if a number of fields associated with the key and the version identifier stored in logging table 320 is equal to a threshold value (e.g., equal to 16 fields), the logging table 320 can be indexed using two non-unique indices (or unique indices)—one non-unique set of indices for the keys and one non-unique set of indices for the version identifiers. If the number of fields associated with the key and the version identifier stored in logging table 320 is greater than the threshold value, the non-unique set of indices can include, for example, a number of fields (e.g., a number of fields that are database management system specific).

Figure 4A:
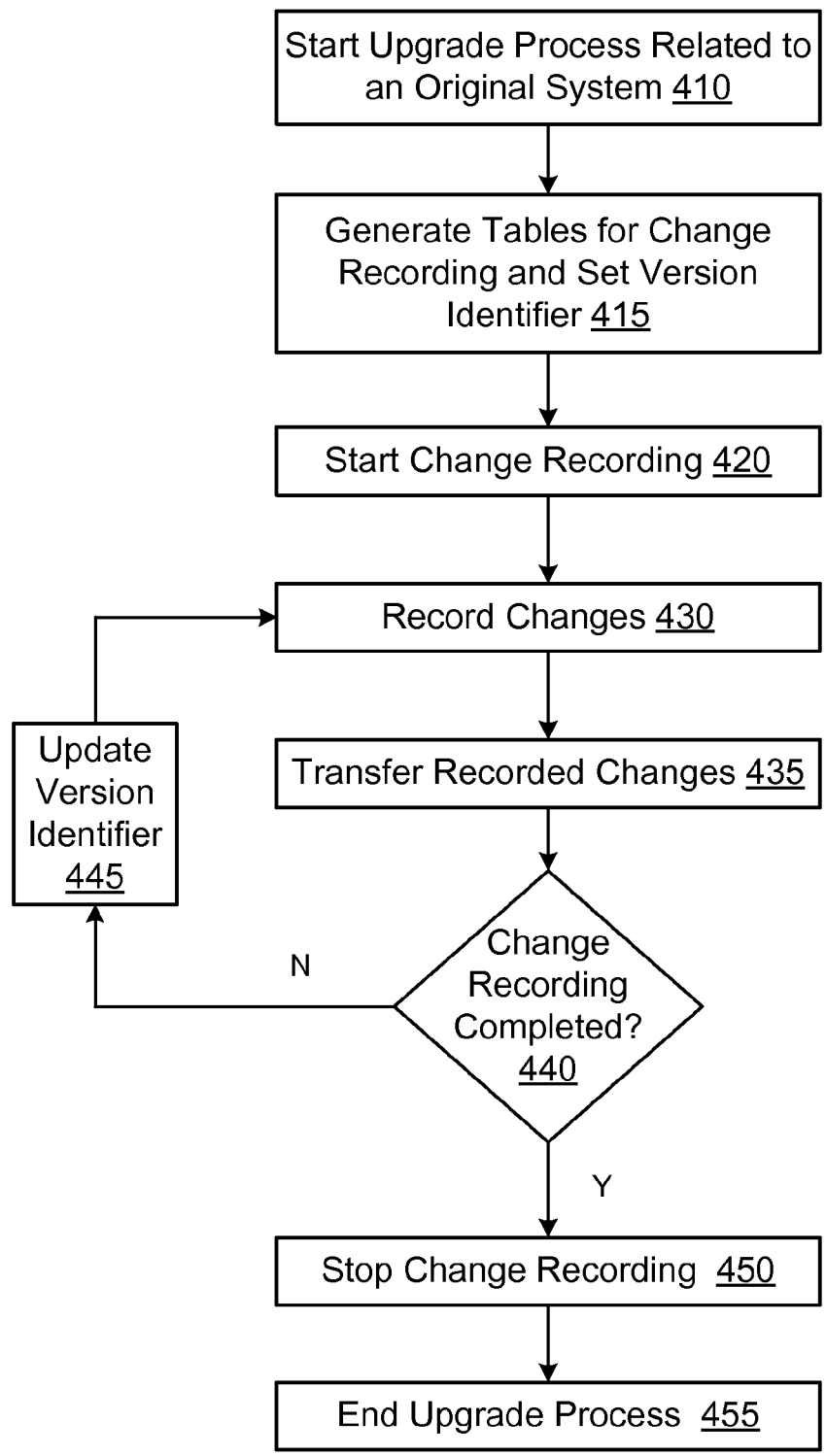
FIGS. 4A and 4B are diagrams that illustrate methods for implementing change recording during an upgrade process.

FIG. 4A is a diagram that illustrates a method for implementing change recording during an upgrade process. In some embodiments, portions of the flowchart can be implemented by, for example, a system upgrade module such as the system upgrade module 170 shown in FIG. 1. In this embodiment, only some portions of the method for implementing change recording are explicitly shown. In some embodiments, various operations related to change recording (e.g., a change recording process) and/or related to an upgrade process can be added to (or removed from) this method.

As shown in FIG. 4A, after an upgrade process related to an original system has been started (block 410), tables for change recording can be generated and a version identifier can be set (e.g., defined) (block 415). Specifically, a logging table can be generated for each original table targeted for upgrading, and a control table can be generated for all (or a portion) of the logging tables. In some embodiments, the tables for change recording can be generated via an application programming interface.

After the tables for change recording have been generated and the version identifier has been set (block 415), change recording can be started (block 420). In other words, change recording can be switched on. In some embodiments, change recording can be started during certain portions of an upgrade process such as before an initial transfer of data from the original database to the target database. In other words, initial transfer of data can be triggered after change recording has been started (block 420). In some embodiments, when the change recording is started, profile parameters associated with a database interface (DBI) can be defined.

As shown in FIG. 4A, changes can be recorded (block 430), and recorded changes can be transferred (block 435). In some embodiments, the recorded changes can be transferred periodically, randomly, based on a schedule, in response to a certain number of changes being recorded, based on transitions of the upgrade process, and/or so forth. For example, changes can be recorded after a specified period of time has passed. In some embodiments, various after import methods (AIMs) and/or execution of programs after import (XPRAs) can be performed after recorded changes have been transferred. In some embodiments, an AIM can be a method (e.g., an executable program) configured to modify one or more tables so that the table(s) are compatible with, for example, a system upgrade. In some embodiments, an AIM can be configured to produce runtime information, and/or can be configured to generate code that can produce runtime information. Similar to an AIM, an XPRA can be a method (e.g., an executable program) configured to modify one or more of the tables so that the table(s) are compatible with, for example, a system upgrade. In some embodiments, an XPRA may not be configured to produce runtime information.

In some embodiments, a wait period can be implemented between starting change recording (block 420) and recording of changes (block 430). The wait period can be implemented until one or more operations are completed so that change recording can be activated on all affected tables (e.g., all tables targeted for upgrades) in a desirable fashion. For example, in some embodiments, such as database interface embodiments, the wait period can be implemented until array inserts have been completed.

Also, in some embodiments, an initial data transfer can be performed between starting change recording (block 420) and recording of changes (block 430). In some embodiments, the initial data transfer can be a transfer of data from an original table into, for example, a shadow table with or without a common interface. In some embodiments, after the initial data transfer, an original table may have a consistent state with a target table so that the various after import methods (AIMs) and/or execution of programs after import (XPRAs) can be performed.

As shown in FIG. 4A, changes can be recorded (block 430) and recorded changes can be transferred (block 435) iteratively until change recording has been completed (block 440). Also as shown in FIG. 4A, with each iteration of change recording and transferring of changes, the version identifier is updated (block 445) (if change recording has not been completed). In some embodiments, the version identifier can be changed (e.g., toggled) between two or more different version identifiers (e.g., different alley use).

For example, during a first iteration of change recording (or a portion thereof), changes to one or more original tables of the original system that are associated with a version identifier having a first value can be transferred to, for example, one or more target tables. After the first iteration of change recording (or the portion thereof), the version identifier can be updated to a second value. During a second iteration (after the first iteration) of change recording (or the portion thereof), changes to one or more original tables of the original system that are associated with the version identifier having the second value can be transferred to, for example, one or more target tables. After the second iteration of change recording (or the portion thereof), the version identifier can be changed back to the first value. During a third iteration of change recording (or the portion thereof), changes to one or more original tables of the original system can be associated with the version identifier having the first value. Each iteration of change recording can similarly be performed as the version identifier is toggled between the first value and the second value. The change recording and transfer of recorded changes can be performed by processes executing in parallel. More details related to change recording and transferring of recorded changes based on parallel processes are described below.

In some embodiments, a version identifier can be associated with a partition of a logging table. Specifically, a version identifier having a first value can be associated with a first partition of a logging table and a version identifier having a second value can be associated with a first partition of a logging table. In some embodiments, the version identifiers can be associated with different batches or packets including changes to records. In some embodiments, collisions between different batches or packets of changes to records can be avoided (e.g., substantially avoided) by assigning different version identifiers to different partitions of the logging table.

Figure 5A:
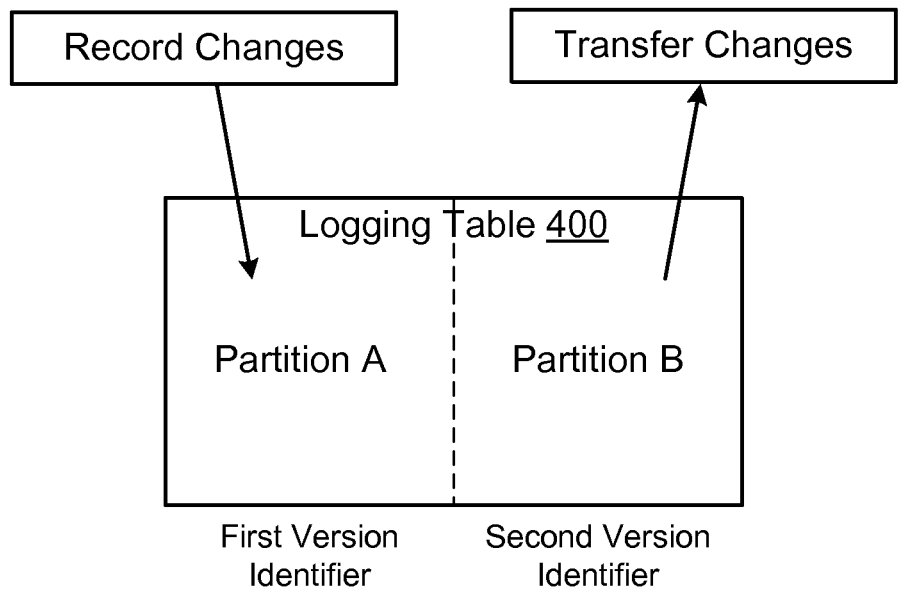
FIGS. 5A and 5B illustrate a logging table having separate partitions that can be associated with version identifiers having different values.
Figure 5B:
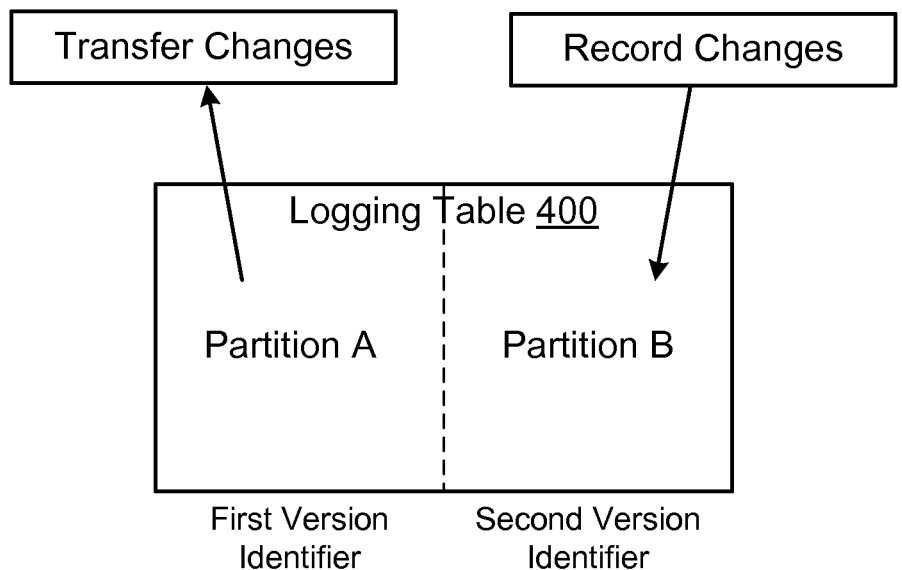

FIGS. 5A and 5B illustrate a logging table 400 having separate partitions that can be associated with version identifiers having different values. As shown in FIGS. 5A and 5B, the logging table 400 has a partition A associated with a first version identifier (e.g., a version identifier having a first value), and the logging table 400 has a partition B associated with a second version identifier (e.g., a version identifier having a second value). The first version identifier and the second version identifier can be stored in a control table (not shown).

As shown in FIG. 5A, changes (e.g., changes identified using keys associated with records) can be recorded to partition A, which is associated with the first version identifier, while changes can be transferred (in parallel) from partition B, which is associated with the second version identifier. While changes are being transferred from partition B, the partition B can be locked so that information may not be written to the partition B. As shown in FIG. 5B, changes can be recorded to partition B, which is associated with the first version identifier, while changes can be transferred (in parallel) from partition A, which is associated with the second version identifier. While changes are being transferred from partition A, the partition A can be locked so that information may not be written to the partition A.

In some embodiments, change recording can alternate between FIG. 5A and FIG. 5B. For example, a first set of changes can be recorded to partition A during a first time period in association with a first version identifier (which can be stored in a control table during the first time period), and the first set of changes recorded to partition A can be transferred during a second time period in associated with a second version identifier (which can be stored in the control table during the second time period). During the first time period, a second set of changes previously recorded to partition B can be transferred from partition B while the first set of changes are being recorded to partition A. During the second time period, a third set of changes can be recorded to partition B in association with the first version identifier (which can be stored in the control table during the third time period) while the first set of changes are being transferred from partition A. The third set of changes recorded to partition A during the second time period can be transferred from the partition A from the third time period. Accordingly, changes can be alternately (and cyclically) recorded to each of the partitions of the logging table 400, and the changes can be associated with a version identifier that is stored in a control table. In some embodiments, a wait time period can be implemented between changing of a version identifier (e.g., changing a current version identifier to a subsequent version identifier) (or commencing recording/transferring of changes to/from a partition of the logging table 400) so that an operation that was started with a version identifier can be completed before the version identifier is changed.

Referring back to FIG. 4A, in some embodiments, a system (e.g., the original system, a logging table) can be locked (and changed into downtime or a downstate) before or after a final iteration of changes are recorded (block 430) and the recorded changes are transferred (block 435). In some embodiments, before the final transfer is initiated, all users can be logged off from the original system. The users may be logged off so that final changes to the original system can be transferred to a target system (and/or a shadow system) without intervening changes disrupting the final transfer of changes.

In some embodiments, before the final transfer is initiated, batch jobs scheduled for execution within the original system can be suspended. In some embodiments, batch jobs may be permanently suspended or may be temporarily suspended. In some embodiments, the batch jobs can include processing of data within an original table. After the final transfer, functionality associated with transfer of data from the original system to a target system (and/or a shadow system) can be turned off (e.g., disabled, deactivated).

In some embodiments, one or more iterations of recording changes (block 430) and/or transfer of recorded changes (block 435) can be manually triggered by a user and/or an administrator. In some embodiments, deletions and/or modifications (which are different types of changes) can be recorded separately (during block 430) and/or transferred separately (during block 435). In some embodiments, deletions can be recorded and/or transferred before modifications are recorded and/or transferred, and vice versa.

As shown in FIG. 4A, change recording can be stopped (block 450) after change recording has been completed (block 440). In some embodiments, change recording can be stopped after all changes have been recorded (block 430) and transferred (block 435). After change recording has been stopped, an upgrade process can be ended (block 455).

Figure 4B:
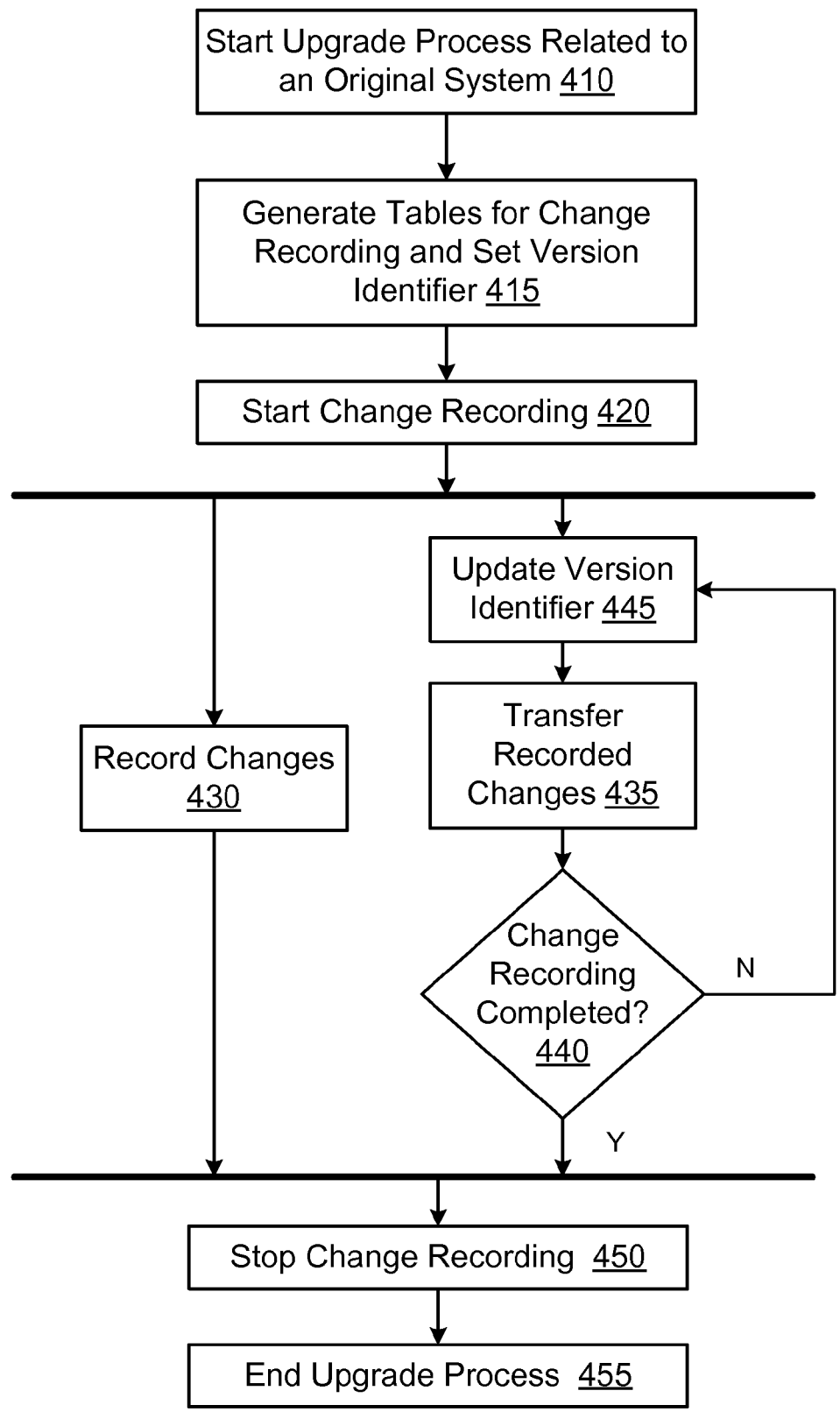

In some embodiments, recording of changes and transferring of recorded changes can be associated with processes that operate in parallel and/or operate as independent processes. For example, a process of recording of changes can be continually executed in parallel with a process of transferring of recorded changes until all recorded changes have been transferred. FIG. 4B is a diagram that illustrates processes for recording of changes and transferring of recorded changes being executed in parallel. As shown in FIG. 4B, change recording 430 is shown (on the left side of the flowchart) as operating in parallel with version identifier updating 445, transfer of recorded changes 435, and determining whether or not change recording has been completed 440 (on the right side of the flowchart). These parallel processes are illustrated as both being triggered to start when change recording is started (block 420) and as both being triggered to stop when change recording is stopped (block 450).

Even though processes associated with change recording and transferring of recorded changes are executing in parallel, changes can be recorded and recorded changes can be transferred, during several iterations. Specifically, during a first iteration, changes can be recorded and associated with a version identifier while changes that were previously recorded and associated with a prior version identifier can be transferred. During a second iteration, changes that were recorded and associated with the version identifier during the first iteration can be transferred while new changes can be recorded and associated with a subsequent version identifier.

Figure 6:
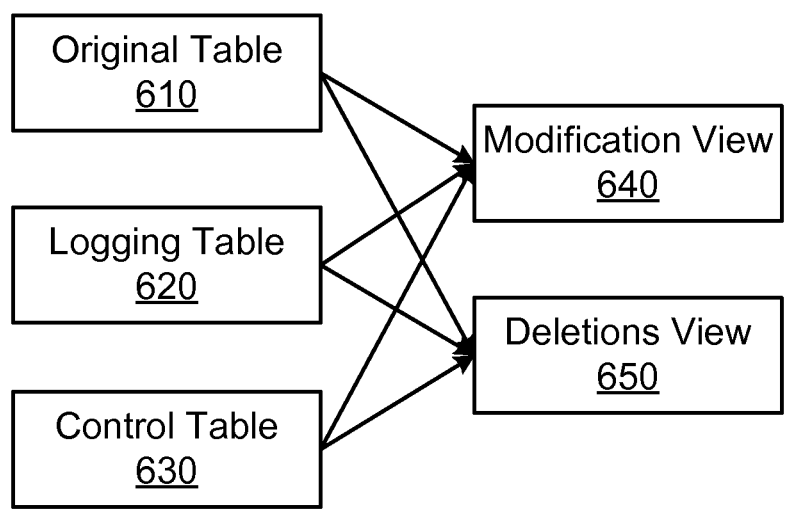
FIG. 6 is a diagram that illustrates access views that can be generated, according to an embodiment.

FIG. 6 is a diagram that illustrates access views that can be generated, according to an embodiment. Specifically, as shown in FIG. 6, a modification view 640 and a deletions view 650 are generated from a combination of an original table 610 (e.g., a source table) (which can be referred to as $T_{ORIGINAL}$), a logging table 620 (which can be referred to as $T_{LOG}$), and/or a control table 630 (which can be referred to as $T_{CONTROL}$). In some embodiments, the modification view 640 and the deletions view 650 can collectively, or individually, be referred to as access views. A user can view modifications (e.g., modification data) to the original table 610 during an upgrade process via the modification view 640, and a user can view deletions (e.g., deletion data) to the original table 610 during an upgrade process via the deletions view 650.

The modification view 640 can include references (e.g., links, pointers) to records (e.g., rows) of the original table 610 which have been modified during an upgrade process. In some embodiments, the modification view 640 can be generated using an operation having the following form:

SELECT A.KEYS, A.DATA FROM $T_{ORIGINAL}$ A, $T_{LOG}$ B WHERE A.KEYS=B.KEYS AND B.OPERATION='M' AND B.VERSION=(SELECT VERSION–1 FROM $T_{CONTROL}$).

The deletions view 650 can include, for example, keys associated with (e.g., identifying) the records (e.g., rows) of the original table 610 which have been deleted during an upgrade process. In some embodiments, the deletions view 650 can be generated using an operation having the following form:

SELECT KEYS FROM $T_{LOG}$ WHERE OPERATION='D' AND VERSION=(SELECT VERSION–1 FROM $T_{CONTROL}$).

In some embodiments, the access views can be used to hide the details of concrete change data recording implementations (e.g., implementations related to a system upgrade module such as system upgrade module 170) from a consumer and to simplify the processing of changes.

Figure 7:
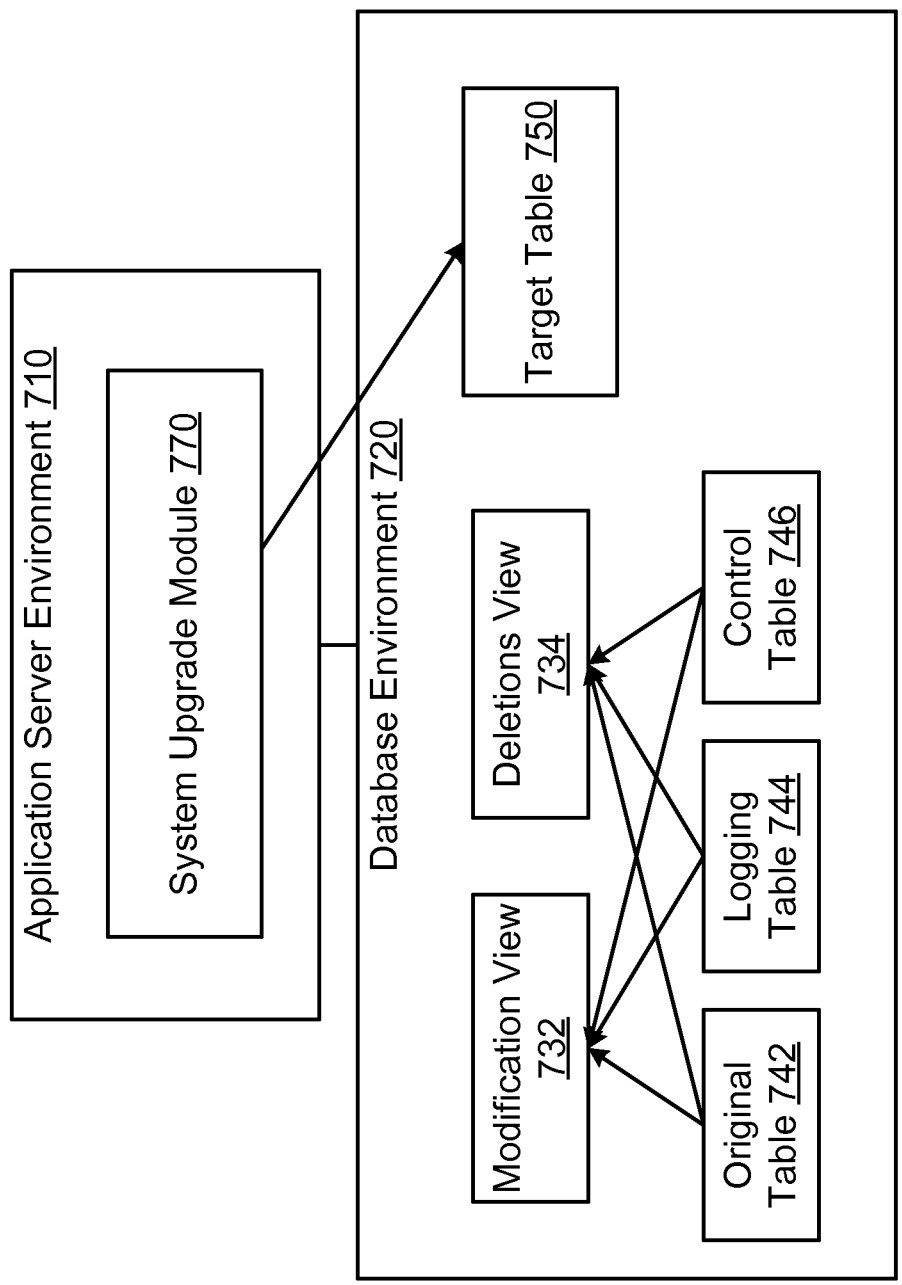
FIG. 7 is a diagram that illustrates a change recording process implemented within a system, according to an embodiment.

FIG. 7 is a diagram that illustrates a change recording process implemented within a system, according to an embodiment. Specifically, FIG. 7 illustrates a system upgrade module 770 operating within an application server environment 710 configured to access a database environment 720. In this embodiment, the system upgrade module 770 is configured to facilitate upgrading of an original table 742 to a target table 750. The system upgrade module 770 can be configured to implement a change recording process using a logging table 744 and a control table 746. As shown in FIG. 7, a modification view 732 and a deletions view 734 can be generated based on the original table 742, the logging table 744, and/or the control table 746.

In some embodiments, at least some portions of the target table 750 can be generated (e.g., updated during a change recording process) based on modification view 732 and/or the deletions view 734. In some embodiments, at least some portions of the target table 750 can be generated (e.g., updated during a change recording process) based on the original table 742, the logging table 744 and/or the control table 746.

Figure 8:
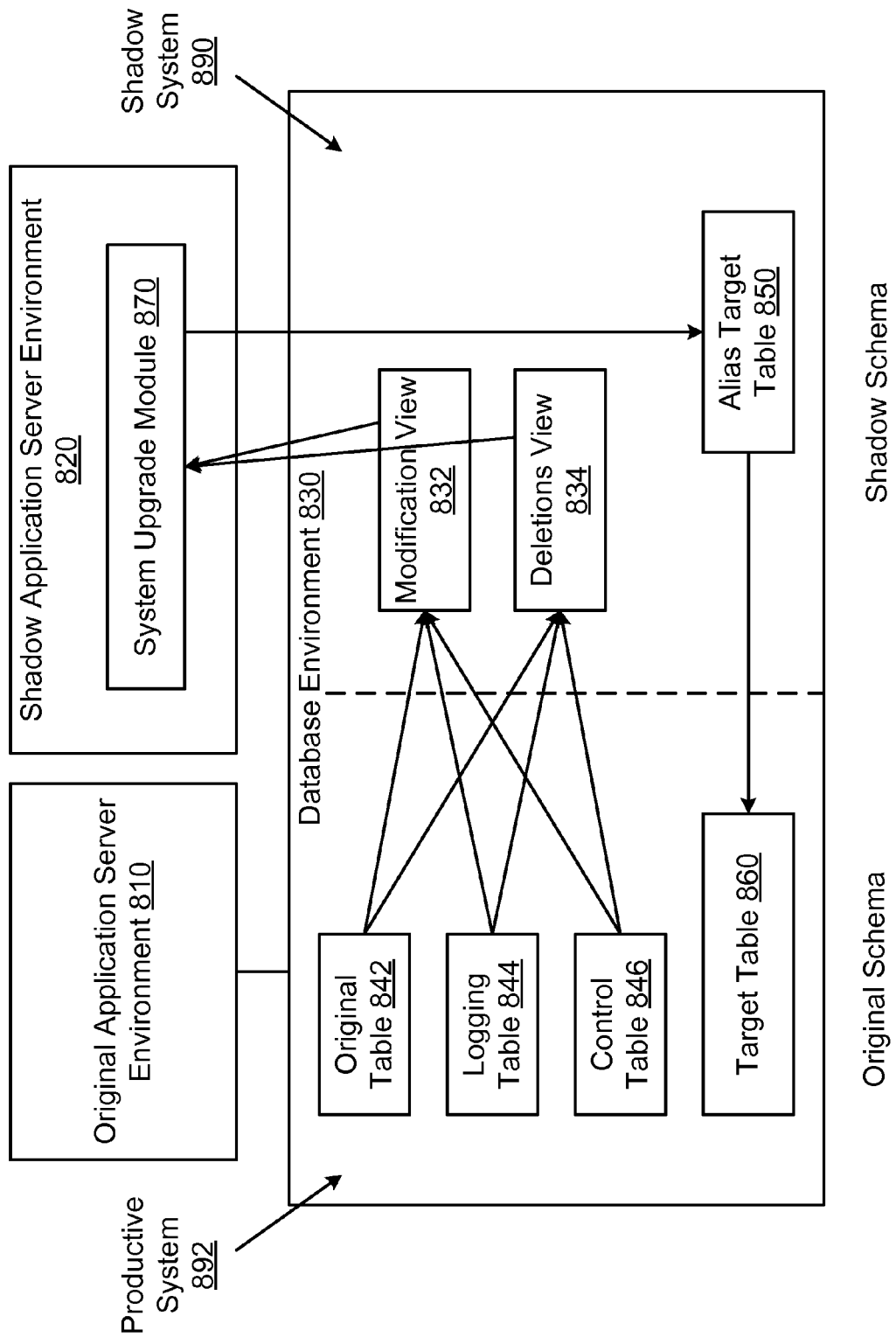
FIG. 8 is a diagram that illustrates a change recording process implemented within a shadow system configuration, according to an embodiment.

FIG. 8 is a diagram that illustrates a change recording process implemented within a shadow system configuration, according to an embodiment. In this embodiment, a shadow system 890, which is installed parallel to a productive system 892, shares a database environment 830 with the productive system 892. As shown in FIG. 8, a system upgrade module 870 operating within shadow server environment 820 is configured to access a database environment 830. In this embodiment, the system upgrade module 870 is configured to facilitate upgrading of an original table 842 to a target table 860 via the shadow system 890. As shown in FIG. 8, the productive system 892 of the database environment 830 is associated with an original application server environment 810.

The productive system 892 and the shadow system 890 operate based on different schema for separation of database access. Specifically, the productive system 892 operates based on an original schema, and the shadow system 890 operates based on a shadow schema (also can be referred to as a target schema). In some embodiments, the tables (e.g., objects) can be located (e.g., physically located) in the productive system 892 (and operate based on the original schema), and the tables included in the shadow system 890 can have references (e.g., aliases) to the tables in the productive system 892. For example, an alias target table 850, which includes references to the target table 860, operates within the shadow system 890.

As shown in FIG. 8, the shadow system 890 and the productive system 892 can be configured to operate within a common set of hardware (e.g., a common set of servers, a common network) of the database environment 830, but can be operating within different partitions represented by the dashed line. In some embodiments, the shadow system 890 and productive system 892 may not be operating in different partitions and/or may not be operating based on different platforms. Although not shown, in some embodiments, portions of the shadow system 890 and/or portions of the and productive system 892 can be defined so that they operate within different sets of hardware and/or in different environments. In some embodiments, the shadow system 890 can be implemented as a virtual system (e.g., as a virtual machine).

As shown in FIG. 8, the system upgrade module 870 can be configured to implement a change recording process using a logging table 844 and a control table 846, which are on the productive system 892. As shown in FIG. 8, a modification view 832 and a deletions view 834 can be generated based on the original table 842, the logging table 844, and/or the control table 846. In this embodiment, the modification view 832 and the deletions view 834 operate within the shadow system 890. In some embodiments, the modification view 832 and the deletions view 834 can reference (e.g., can be aliased to) the tables (e.g., the original table 842, the logging table 844, the control table 846) in the productive system 892.

In some embodiments, at least some portions of the target table 860 can be generated (e.g., updated during a change recording process) based on modification view 832 and/or the deletions view 834. In some embodiments, at least some portions of the target table 860 can be generated (e.g., updated during a change recording process) based on the original table 842, the logging table 844 and/or the control table 846.

As shown in FIG. 8, some of the tables related to a change recording process operate within the productive system 892 and some of the tables operate within the shadow system 890. In this embodiment, the logging table 844 and/or the control table 846 can operate within the productive system 892 based on the original schema so that they can be accessed by, for example, a database interface (DBI). The access views—modification view 832 and deletions view 834—can be generated in the shadow system 890 so that the data transfer can be realized in the shadow system 890. In some embodiments, the system configuration shown in FIG. 8 can reduce the processing load (e.g., resource load) on the productive system 892, which is intended for productive use by one or more users.

Figure 9:
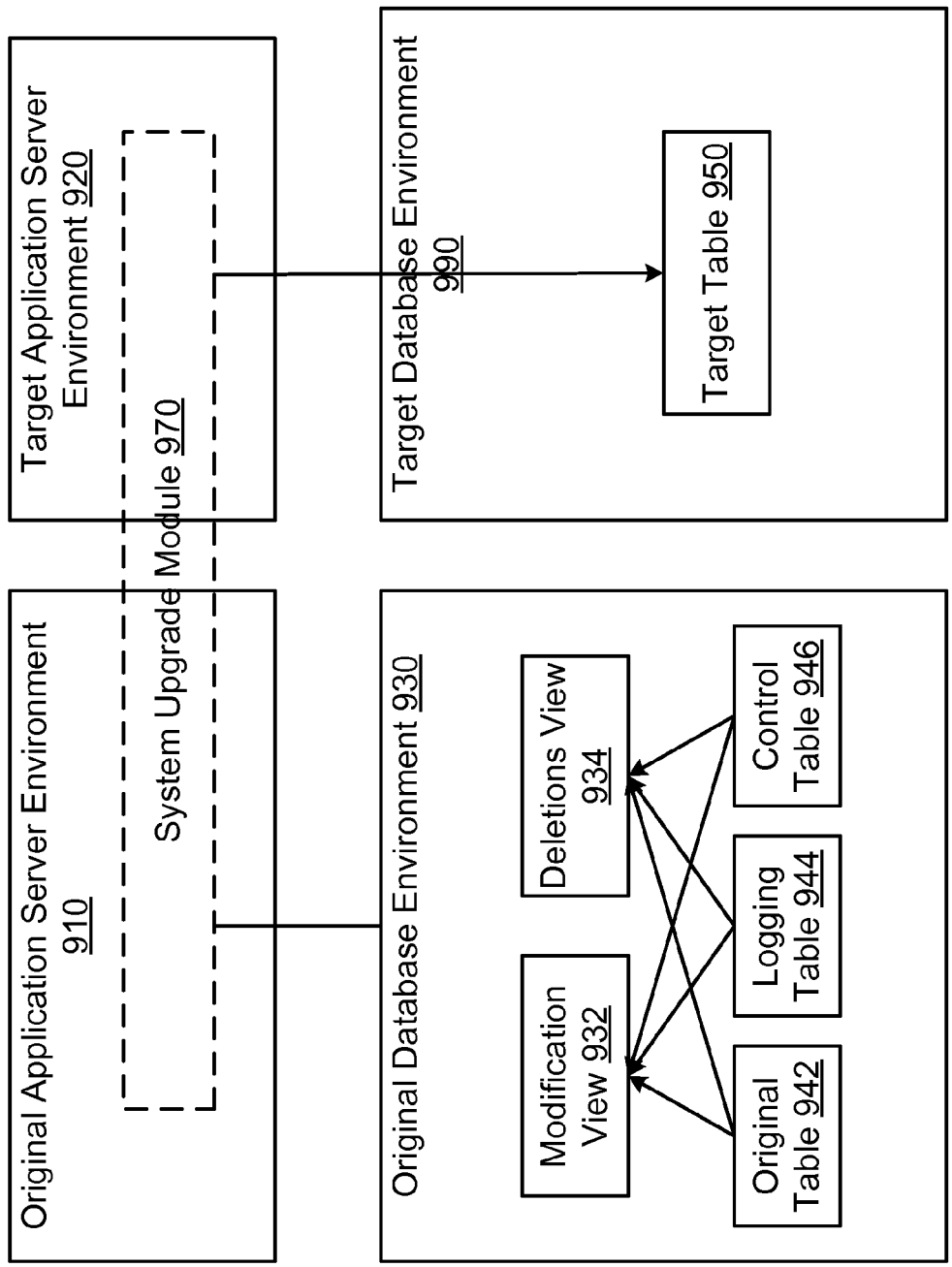
FIG. 9 is a diagram that illustrates a change recording process implemented within another system configuration, according to an embodiment.

FIG. 9 is a diagram that illustrates a change recording process implemented within another system configuration, according to an embodiment. In this embodiment, a system upgrade module 970 has at least a first portion (e.g., a change table generator, a change recorder) configured to operate within an original application server environment 910 associated with an original database environment 930 and a second portion (e.g., a change transfer module) configured to operate within a target application server environment 920 associated with a target database environment 990. In this embodiment, the system upgrade module 970 is configured to facilitate upgrading of an original table 942 included in the original database environment 930 to a target table 950 included in the target database environment 990. In some embodiments, the original database environment 930 in the target database environment 990 can be based on different database schema. In some embodiments, the system configuration shown in FIG. 9, which can be referred to as a remote system configuration, can be used in a migration use case.

In some embodiments, at least some portions of the target table 950 can be generated (e.g., updated during a change recording process) based on a modification view 932 and/or a deletions view 934. In some embodiments, at least some portions of the target table 950 can be generated (e.g., updated during a change recording process) based on the original table 942, a logging table 944 and/or a control table 946.

In some embodiments, the remote system configuration can be used in Lifecycle Management (LM) scenarios (in a software engineering context) including database and/or unicode migrations. In some embodiments, such a setup can be used in Integrated Upgrade and Unicode Conversion (IUUC) or Incremental Migration (IMIG) scenarios (which can be associated with LM procedures) to take advantage of DBI-based change data capturing implementations.

Implementations of the various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry (e.g., an FPGA (field programmable gate array) or an ASIC (application-specific integrated circuit)).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory may be supplemented by, or incorporated in special purpose logic circuitry.

To provide for interaction with a user, implementations may be implemented on a computer having a display device (e.g., a cathode ray tube (CRT), a light emitting diode (LED), or liquid crystal display (LCD) display device) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

Implementations may be implemented in a computing system that includes a back-end component (e.g., as a data server), or that includes a middleware component (e.g., an application server), or that includes a front-end component (e.g., a client computer having a graphical user interface or a Web browser) through which a user can interact with an implementation, or any combination of such back-end, middleware, or front-end components. Components may be interconnected by any form or medium of digital data communication (e.g., a communication network). Examples of communication networks include a local area network (LAN) and a wide area network (WAN) (e.g., the Internet).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A system comprising:
   at least one processor;
   a non-transitory computer-readable medium storing executable instructions that when executed by the at least one processor implement:
   a logging table generator configured to generate a logging table corresponding with an original table targeted for an upgrade, the logging table including a first partition for logging changes to the original table during a first time period and a second partition for logging changes to the original table during a second time period;
   a control table generator configured to generate a control table configured to store a batch identifier, the batch identifier having a first value for changes logged in the first partition of the logging table during the first time period, the batch identifier having a second value for changes logged in the second partition of the logging table during the second time period, the control table being separate from the logging table, wherein only the batch identifier is stored in the control table;
   a batch identifier generator configured to set the first value as the batch identifier in the control table;
   a key recorder configured to store, in the first partition of the logging table, primary keys of records for the changes during the first time period, wherein only the primary keys are stored in the first partition of the logging table,
   the batch identifier generator configured to replace the first value with the second value for the batch identifier in the control table,
   the key recorder configured to store, in the second partition of the logging table, primary keys of records for the changes during the second time period, wherein only the primary keys are stored in the second partition of the logging table; and
   a change transfer module configured to transfer, from the first partition of the logging table to a target system, the changes associated with the first value during the second time period during which the primary keys of records associated with the second value are stored in the second partition.

2. The system of claim 1, wherein, during the first time period, the changes to the original table include a first change and a second change, the first change and the second change relating to a same record of the original table, wherein a primary key associated with the same record is stored only once in the logging table.

3. The system of claim 1, wherein the at least one processor further implements:
   an upgrade module configured to generate a shadow table corresponding with the original table, the portion of the upgrade including operating on the shadow table while the original table is in uptime.

4. The system of claim 1, wherein the at least one processor further implements:
   a version generator configured to toggle between the first value and the second value.

5. The system of claim 1, wherein the logging table is included in a plurality of logging tables associated with a plurality of original tables including the original table, each original table from the plurality of tables is associated a single logging table from the plurality of logging tables.

6. The system of claim 1, wherein the logging table is included in a plurality of logging tables, the control table is a single control table associated with the plurality of logging tables.

7. The system of claim 1, wherein changes to the original table during the first time period include a modification of a record,
   the at least one processor further implements:
   a view generator configured to cause the at least one processor to define, based on the logging table, the original table, and the control table, a modification view including a reference to the record of the original table, the view generator configured to cause the at least one processor to provide the modification view to a user such that the user can view the modification of the record.

8. The system of claim 1, wherein the changes to the original table during the first time period include a deletion of a record,
   the at least one processor further implements:
   a view generator configured to cause the at least one processor to define, based on the logging table, the original table, and the control table, a deletion view including a primary key of the record of the original table, the view generator configured to provide the deletion view to a user such that the user can review the deletion of the record.

9. The system of claim 1, wherein the change transfer module is configured to lock the first partition of the logging table while the changes to the original table associated with the first value are transferred from the first partition to the target system such that information cannot be recorded to the first partition, and the key recorder is configured to store the primary keys of the records associated with the second value while the first partition is locked.

10. The system of claim 1,
    wherein the change transfer module is configured to transfer the changes to the original table associated with the first value to a shadow table included in a shadow system while recording the changes to the original table associated with the second value.

11. The system of claim 1,
    the at least one processor further implements:
    an index module configured to define a unique index for a primary key when a number of primary keys included in the primary keys is less than a threshold value and configured to define a non-unique index for the primary key when the number of primary keys included in the primary keys is greater than or equal to the threshold value.

12. The system of claim 1,
    the at least one processor further implements:
    an index module configured to define a non-unique index including a number of fields when a total number of fields including the primary keys and the batch identifier is more than sixteen.

13. The computer system of claim 1, wherein the control table has only one entry, the entry being the batch identifier.

14. A non-transitory computer-readable storage medium storing code representing instructions that when executed are configured to cause a processor to perform a process, the code comprising code to:
   generate a logging table corresponding with an original table targeted for an upgrade, the logging table including a first partition for logging changes to the original table during a first time period and a second partition for logging changes to the original table during a second time period;

generate a control table configured to store a batch identifier, the batch identifier having a first value for changes logged in the first partition of the logging table during the first time period, the batch identifier having a second value for changes logged in the second partition of the logging table during the second time period, the control table being separate from the logging table, wherein only the batch identifier is stored in the control table;

set the first value as the batch identifier in the control table;

store, in the first partition of the logging table, primary keys of records for the changes during the first time period, wherein only the primary keys are stored in the first partition of the logging table;

replace the first value with the second value for the batch identifier in the control table;

store, in the second partition of the logging table, primary keys of records for the changes during the second time period, wherein only the primary keys are stored in the second partition of the logging table; and transfer, from the first partition of the logging table to a target system, the changes associated with the first value during the second time period during which the primary keys of records associated with the second value are stored in the second partition.

15. The non-transitory computer-readable storage medium of claim 14, wherein, during the first time period, the changes to the original table include a first change and a second change, the first change and the second change relating to a same record of the original table, wherein a primary key associated with the same record is stored only once in the logging table.

16. The non-transitory computer-readable storage medium of claim 14, further comprising code to:

generate a shadow table corresponding with the original table, the portion of the upgrade includes operating on the shadow table while the original table is in uptime.

17. A method including executing instructions recorded on a non-transitory computer-readable storage media using at least one processor, the method comprising:

generating a logging table corresponding with an original table targeted for an upgrade, the logging table including a first partition for logging changes to the original table during a first time period and a second partition for logging changes to the original table during a second time period;

generating a control table configured to store a batch identifier, the batch identifier having a first value for changes logged in the first partition of the logging table during the first time period, the batch identifier having a second value for changes logged in the second partition of the logging table during the second time period, the control table being separate from the logging table, wherein only the batch identifier is stored in the control table;

setting the first value as the batch identifier in the control table;

storing, in the first partition of the logging table, primary keys of records for the changes during the first time period, wherein only the primary keys are stored in the first partition of the logging table;

replacing the first value with the second value for the batch identifier in the control table;

storing, in the second partition of the logging table, primary keys of records for the changes during the second time period, wherein only the primary keys are stored in the second partition of the logging table; and transferring, from the first partition of the logging table to a target system, the changes associated with the first value during the second time period during which the primary keys of records associated with the second value are stored in the second partition.

18. The method of claim 17, further comprising:

generating a shadow table corresponding with the original table, the portion of the upgrade including operating on the shadow table while the original table is in uptime.

19. The method of claim 17, further comprising:

locking the first partition of the logging table while the first set of changes associated with the first value are transferred from the first partition such that information cannot be recorded to the first partition; and storing the primary keys of records associated with the second value while the first partition is locked.

20. The method of claim 17, wherein the first value is incremented and replaced by the second value.

* * * * *